US011920742B1

(12) United States Patent
Zou

(10) Patent No.: US 11,920,742 B1
(45) Date of Patent: Mar. 5, 2024

(54) BULB STRUCTURE

(71) Applicant: Xinjiang Zou, Meizhou (CN)

(72) Inventor: Xinjiang Zou, Meizhou (CN)

( * ) Notice: Subject to any disclaimer, the term of this patent is extended or adjusted under 35 U.S.C. 154(b) by 0 days.

(21) Appl. No.: 18/306,268

(22) Filed: Apr. 25, 2023

(51) Int. Cl.
*F21K 9/238* (2016.01)
*F21V 19/00* (2006.01)

(52) U.S. Cl.
CPC ............ *F21K 9/238* (2016.08); *F21V 19/003* (2013.01)

(58) Field of Classification Search
CPC ............................... F21K 9/238; F21V 19/003
See application file for complete search history.

(56) References Cited

U.S. PATENT DOCUMENTS 11,015,767 B1 * 5/2021 Liang ...................... F21K 9/235

* cited by examiner

*Primary Examiner* — Karabi Guharay

(57) ABSTRACT

The present disclosure provides a new bulb structure, including a bulb shell, a light source module and a power connection copper head. The light source module includes a light-emitting source inserted into the accommodation cavity of the bulb shell, and the light-emitting source is provided with a light source pin. The light source module further includes a PCB board, the PCB board is clamped into the upper end of the bulb shell, the light source pin is welded to the PCB board and the light source pin is electrically connected to the PCB board. The PCB board is welded with an extension pin, and the extension pin has one end electrically connected to the PCB board and the other end electrically connected to the power connection copper head. Through the above structural design, the present disclosure has advantages of novel structure design and simple preparation process.

6 Claims, 11 Drawing Sheets

BULB STRUCTURE

TECHNICAL FIELD

The present disclosure relates to the technical field of bulbs, more particular to a new bulb structure.

BACKGROUND

To enhance festival atmosphere or activity atmosphere, string lights are generally employed for decoration. The string light includes lamp caps that are electrically connected in sequence through a power line. Each lamp cap is installed with a bulb.

Waterproof Bulb includes a lamp cap, a bulb shell, a flexible glue lamp holder and a core column structure. The core column structure is connected to the lamp cap and extends into the bulb shell. The core column structure includes a first metal lead, an LED lamp strip and a second metal lead which are electrically connected in sequence. Both the first metal lead and the second metal lead are injection molded into an integrated structure with the flexible glue lamp holder and are electrically connected to the lamp cap respectively. The flexible glue lamp holder is tightly mated with an inside of an opening of the bulb shell in a sealing mode.

It should be noted that for the above waterproof bulb, since each metal lead is injection molded into an integrated structure with the flexible glue lamp holder, it is needed to provide one set of injection mold for the core column structure during the preparation process of the waterproof bulb and provide different injection molds for different types of core column structures, which could increase the preparation cost and is complex in preparation process.

SUMMARY

The present disclosure aims to provide a new bulb structure to solve the shortcomings of the existing technologies. The new bulb structure is novel in design and simple in preparation process.

In order to achieve the above aim, the present disclosure is implemented through the following technical solution.

A new bulb structure includes a bulb shell, a light source module and a power connection copper head arranged on an upper end of the bulb shell. The bulb shell has an interior formed with an accommodation cavity having an upward opening, the light source module includes a light-emitting source inserted into the accommodation cavity of the bulb shell, and the light-emitting source is provided with a light source pin.

The light source module further includes a PCB board, the PCB board is clamped into the upper end of the bulb shell, the light source pin is welded to the PCB board and the light source pin is electrically connected to the PCB board.

The PCB board is welded with an extension pin, and the extension pin has one end electrically connected to the PCB board and the other end electrically connected to the power connection copper head.

Herein, the upper end of the bulb shell at an upper opening of the accommodation cavity is formed with two aligned PCB clamping slots, the PCB board is provided with locating protrusions corresponding to each PCB clamping slot respectively, and each locating protrusion of the PCB board is clamped and fixed into a corresponding PCB clamping slot respectively.

Herein, the upper opening of the accommodation cavity of the bulb shell is embedded with a rubber plug, the rubber plug has a lower end formed with a PCB clamping slot corresponding to the PCB board that has a downward opening, and the PCB board is clamped and fixed into the PCB clamping slot of the rubber plug.

The rubber plug has an upper surface formed with a pin through hole communicated with the PCB clamping slot, and the extension pin passes through the pin through hole of the rubber plug and extends to outside the rubber plug.

Herein, the rubber plug has an outer wall formed with an annular groove, inside the annular groove is arranged a waterproof rubber ring, and the waterproof rubber ring is clamped between the rubber plug and an inner wall of the bulb shell.

Herein, the rubber plug has an upper end provided with a limit shoulder projecting outward radially, and the limit shoulder is located against an upper surface of the bulb shell.

Herein, the light source pin, the extension pin or the PCB board is provided with a resistor.

Herein, the power connection copper head is screwed onto the upper end of the bulb shell.

The present disclosure has the following beneficial effects. A new bulb structure provided by the present disclosure includes a bulb shell, a light source module and a power connection copper head arranged on an upper end of the bulb shell. The bulb shell has an interior formed with an accommodation cavity having an upward opening, the light source module includes a light-emitting source inserted into the accommodation cavity of the bulb shell, and the light-emitting source is provided with a light source pin. The light source module further includes a PCB board, the PCB board is clamped into the upper end of the bulb shell, the light source pin is welded to the PCB board and the light source pin is electrically connected to the PCB board. The PCB board is welded with an extension pin, and the extension pin has one end electrically connected to the PCB board and the other end electrically connected to the power connection copper head. Through the above structural design, the present disclosure has advantages of novel structure design and simple preparation process.

BRIEF DESCRIPTION OF DRAWINGS

The present disclosure is described below in further detail in conjunction with drawings. However, the embodiments in the drawings do not constitute any restriction to the present disclosure.

Figure 1:
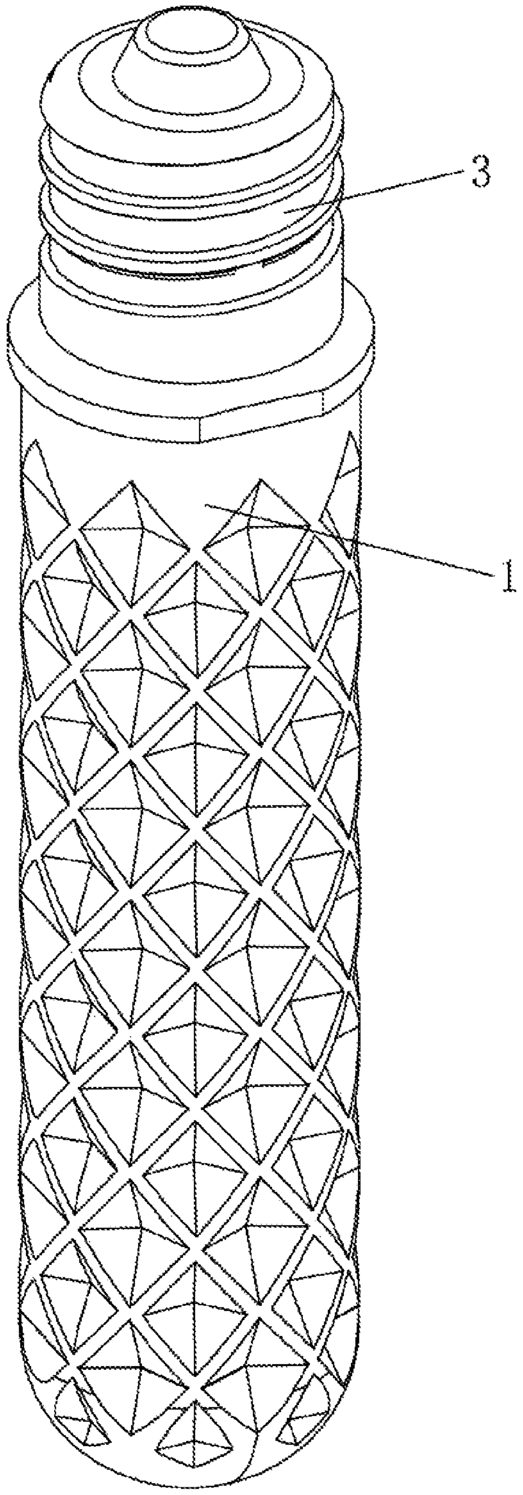
FIG. 1 is a structure diagram of a first embodiment of the present disclosure.

Below is the description of designators in FIG. 1 to FIG. 11.

1, a bulb shell; 11, an accommodation cavity; 2, a light source module; 21, a light emitting source; 211, a light source pin; 22, a PCB board; 221, a locating protrusion; 23, an extension pin; 3, a power connection copper head; 4, a PCB clamping slot; 5, a rubber plug; 51, a pin through hole; 52, an annular groove; 53, a limit shoulder; 6, a waterproof rubber ring; and 7, a resistor.

DETAILED DESCRIPTION

The present disclosure is described below in specific embodiments.

Embodiment 1: as shown in FIG. 1 to FIG. 11, a new bulb structure includes a bulb shell 1, a light source module 2 and a power connection copper head 3 arranged on an upper end of the bulb shell 1. The bulb shell 1 has an interior formed with an accommodation cavity 11 having an upward opening, the light source module 2 includes a light-emitting source 21 inserted into the accommodation cavity 11 of the bulb shell 1, and the light-emitting source 21 is provided with a light source pin 211. The power connection copper head 3 is screwed onto the upper end of the bulb shell 1.

Further, as shown in FIG. 2, FIG. 3, FIG. 4 and FIG. 6, the light source module 2 further includes a PCB board 22. The PCB board 22 is clamped into the upper end of the bulb shell 1, the light source pin 211 is welded to the PCB board 22 and the light source pin 211 is electrically connected to the PCB board 22.

Still further, the PCB board 22 is welded with an extension pin 23, and the extension pin 23 has one end electrically connected to the PCB board 22 and the other end electrically connected to the power connection copper head 3.

It is needed to explain that the power connection copper head 3 is provided with a positive connecting portion and a negative connecting portion that are spaced and insulated from each other. The light source pin 211 is provided with two light source pins 211, respectively being a positive light source pin 211 and a negative light source pin 211. The PCB board 22 is welded with two extension pins 23, respectively being a positive extension pin 23 and a negative extension pin 23. When the light-emitting source 21, the PCB board 22 and the power connection copper head 3 are electrically connected in sequence, the positive light source pin 211 is electrically connected to the positive extension pin 23 though an internal circuit of the PCB board 22, the negative light source pin 211 is electrically connected to the negative extension pin 23 though an internal circuit of the PCB board 22, the positive extension pin 23 contacts and is electrically conductive to the positive connecting portion of the power connection copper head 3, and the negative extension pin 23 contacts and is electrically conductive to the negative connecting portion of the power connection copper head 3.

During the installation process of the new bulb structure of the Embodiment 1, the PCB board 22 is clamped into the bulb shell 1, thereby rapidly installing and fixing the light source module 2. The installation is convenient and quick.

In addition, compared with the injection-molded integrated structure of the light source pins (metal leads) and the flexible glue lamp holder in the existing technologies, the present Embodiment 1 neither needs to set a corresponding injection mold, nor needs to set one set of injection mold for each type of light emitting source 21, but only needs to weld the pin to the PCB board 22. The process is simple and is applicable to different types of light emitting sources 21. Compared with the existing technologies, the new bulb structure in the present Embodiment 1 is simpler in preparation process.

To sum up, through the above structural design, the new bulb structure in the present Embodiment 1 has advantages of novel structure design and simple preparation process.

Figure 2:
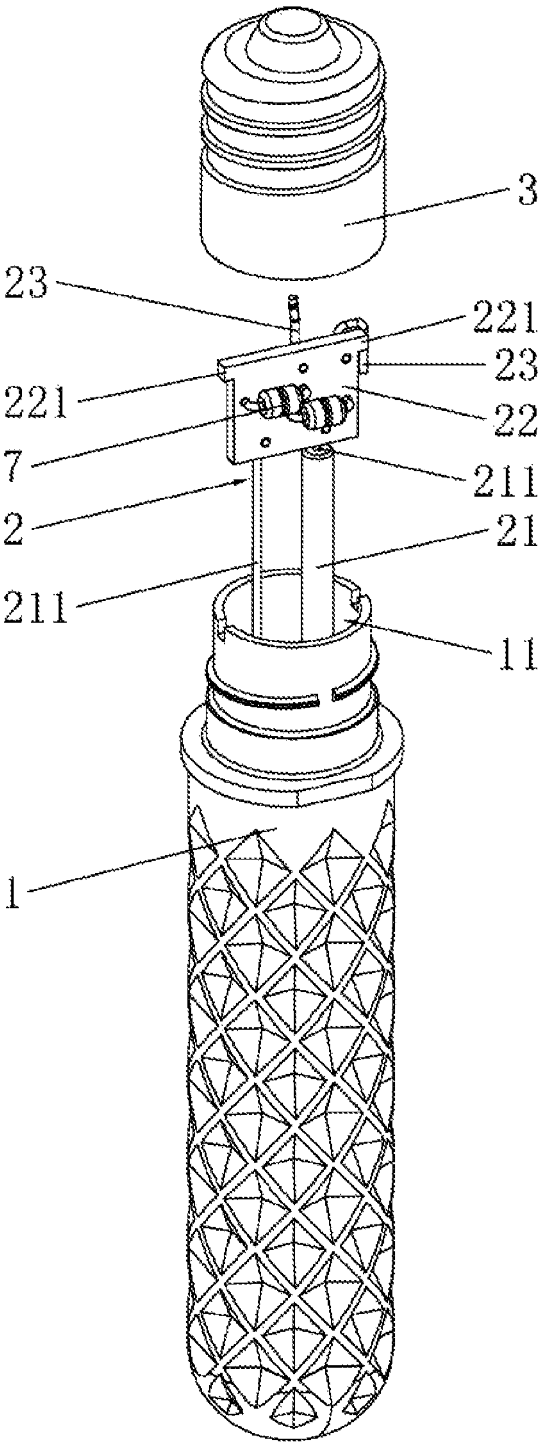
FIG. 2 is an exploded view of FIG. 1.
Figure 3:
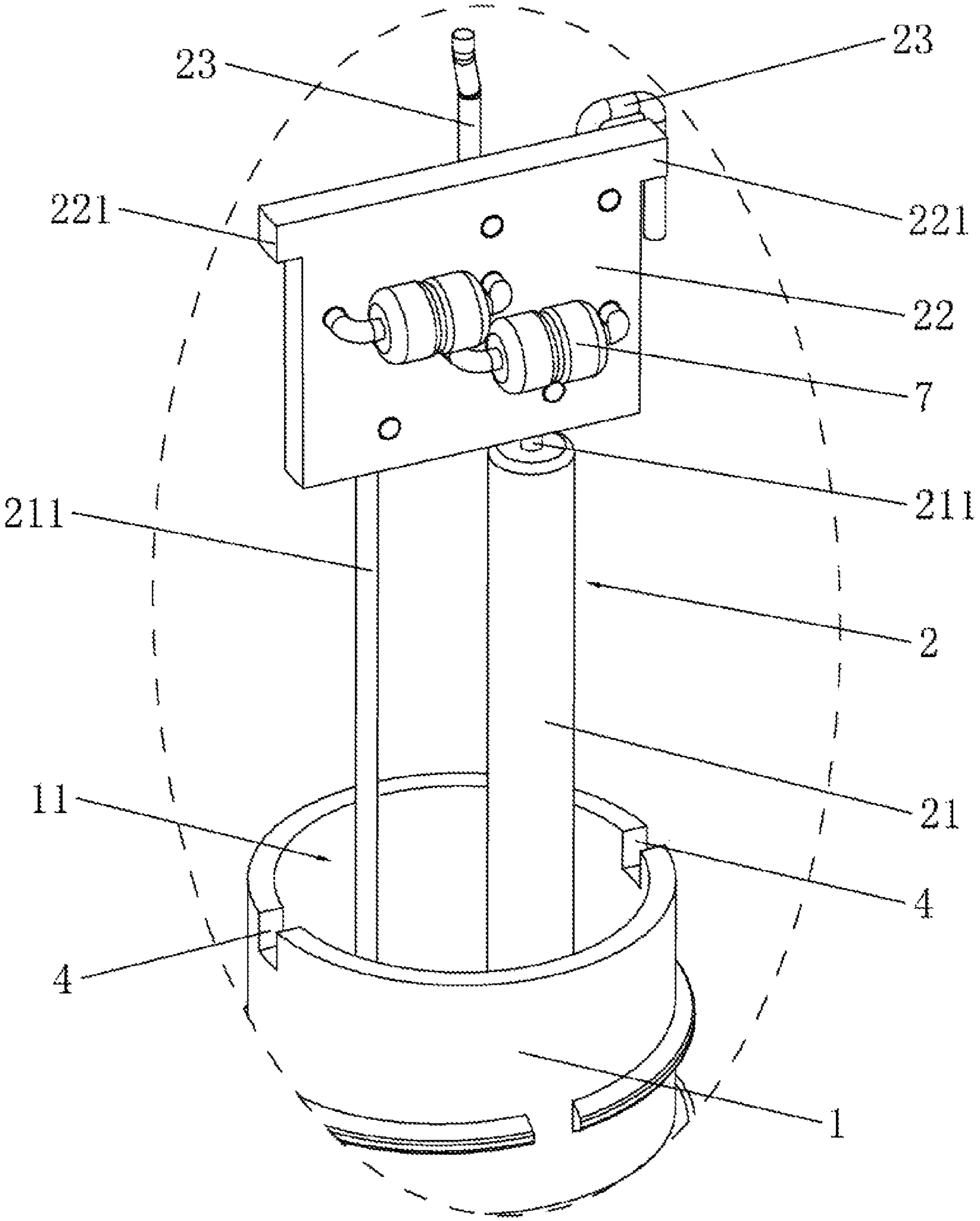
FIG. 3 is a partial structure diagram of FIG. 2.
Figure 4:
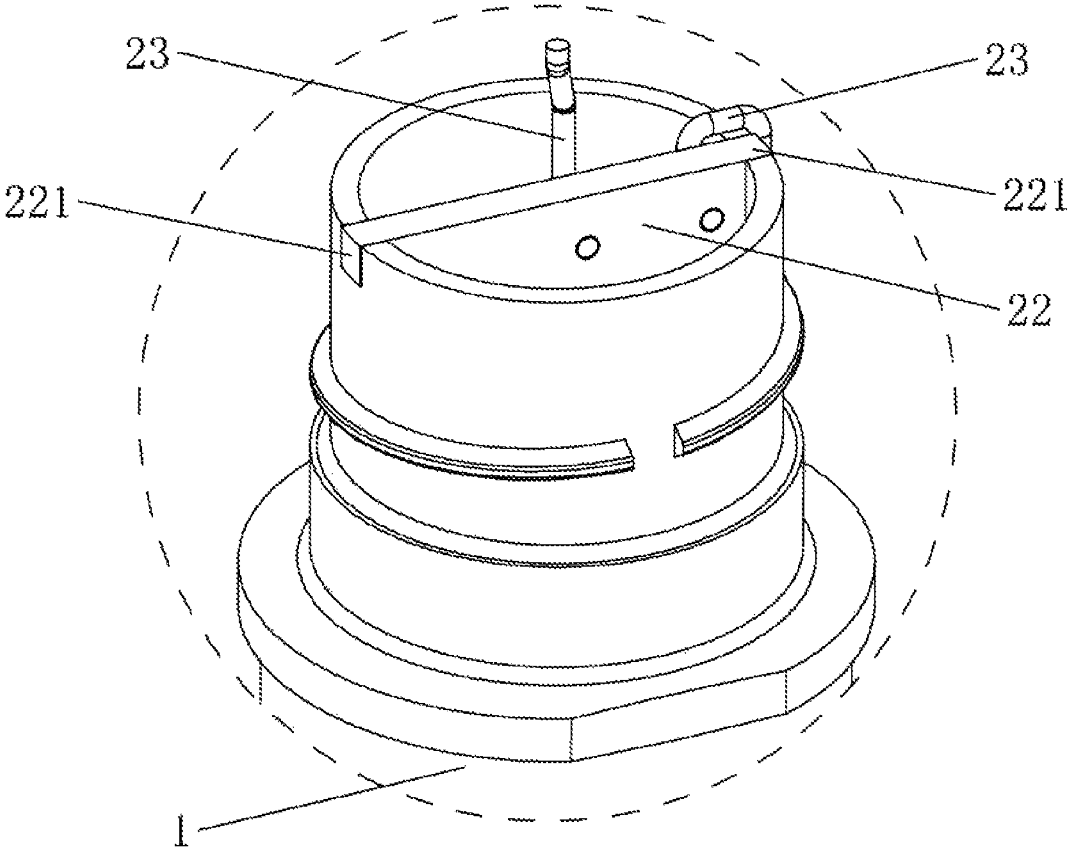
FIG. 4 is a partial structure diagram of a first embodiment of the present disclosure.
Figure 5:
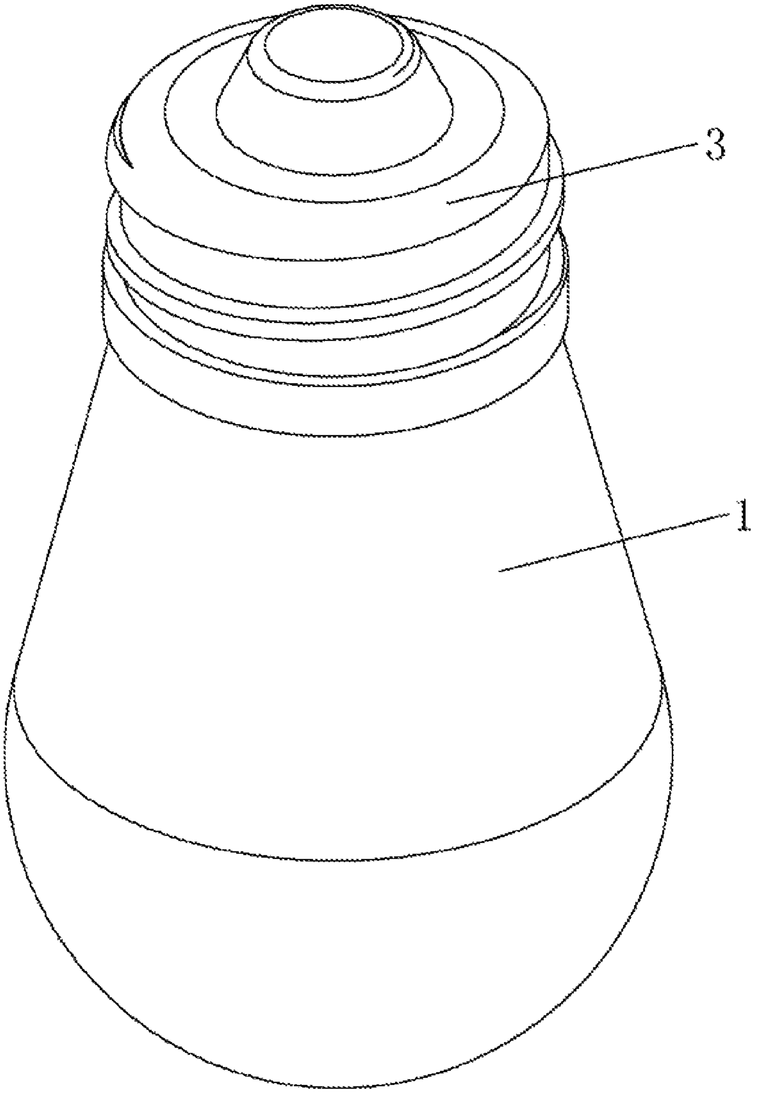
FIG. 5 is a structure diagram of a second embodiment of the present disclosure.

Embodiment 2: as shown in FIG. 2 to FIG. 4, the present Embodiment 2 is different from the Embodiment 1 in that: the upper end of the bulb shell 1 at an upper opening of the accommodation cavity 11 is formed with two aligned PCB clamping slots 4, the PCB board 22 is provided with locating protrusions 221 corresponding to each PCB clamping slot 4 respectively, and each locating protrusion 221 of the PCB board 22 is clamped and fixed into a corresponding PCB clamping slot 4 respectively.

When to install the light source module 2 on the upper end of the bulb shell 1, it is only needed to align and embed each locating protrusion 221 of the PCB board 22 into a corresponding PCB clamping slot 4.

Figure 6:
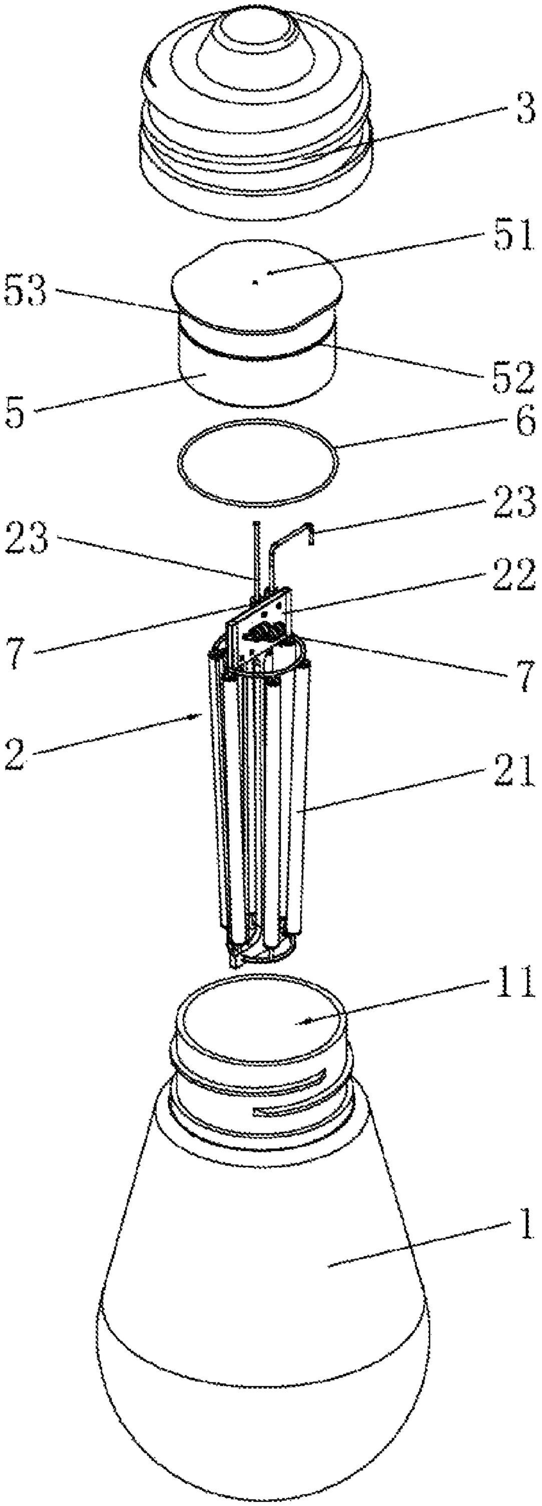
FIG. 6 is an exploded view of FIG. 5.
Figure 7:
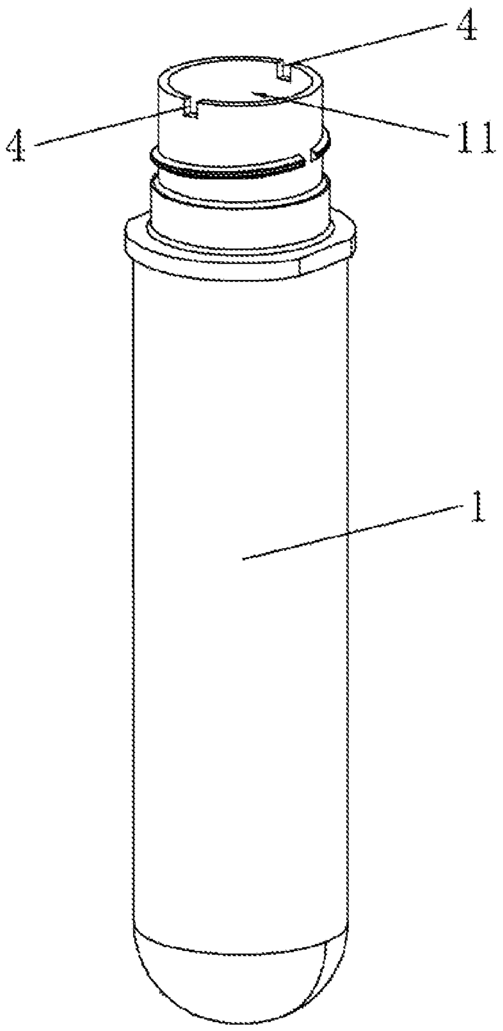
FIG. 7 is a structure diagram of another embodiment of a bulb shell of a first embodiment of the present disclosure.
Figure 8:
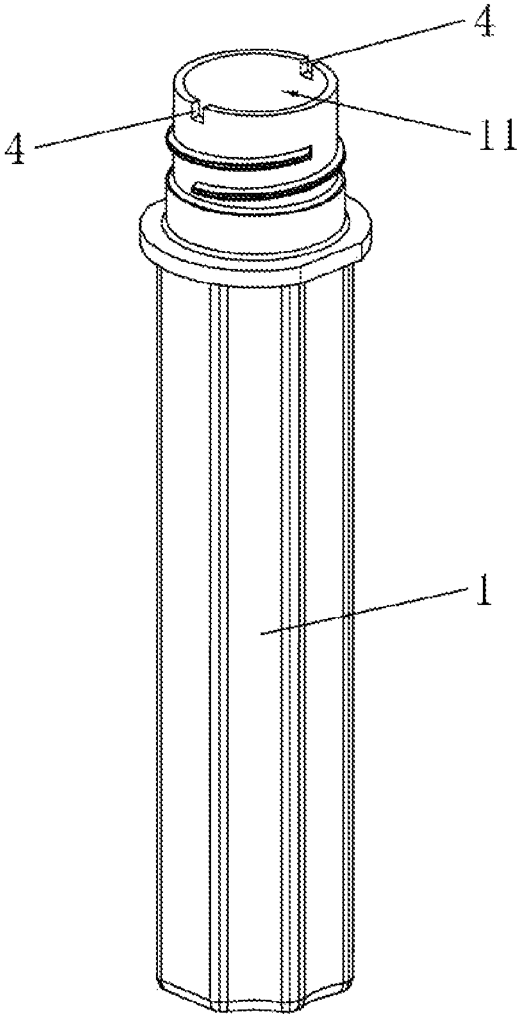
FIG. 8 is a structure diagram of yet another embodiment of a bulb shell of a first embodiment of the present disclosure.
Figure 9:
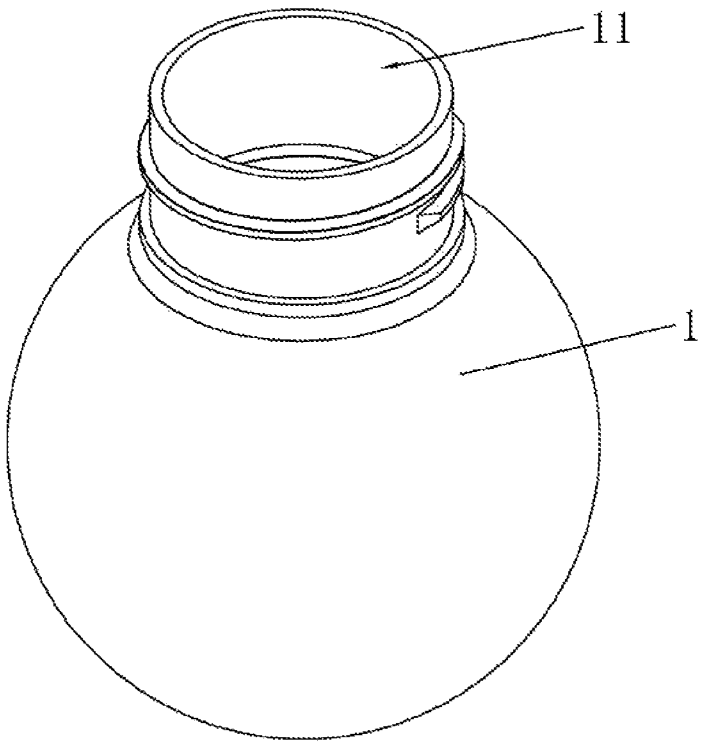
FIG. 9 is a structure diagram of another embodiment of a bulb shell of a second embodiment of the present disclosure.
Figure 10:
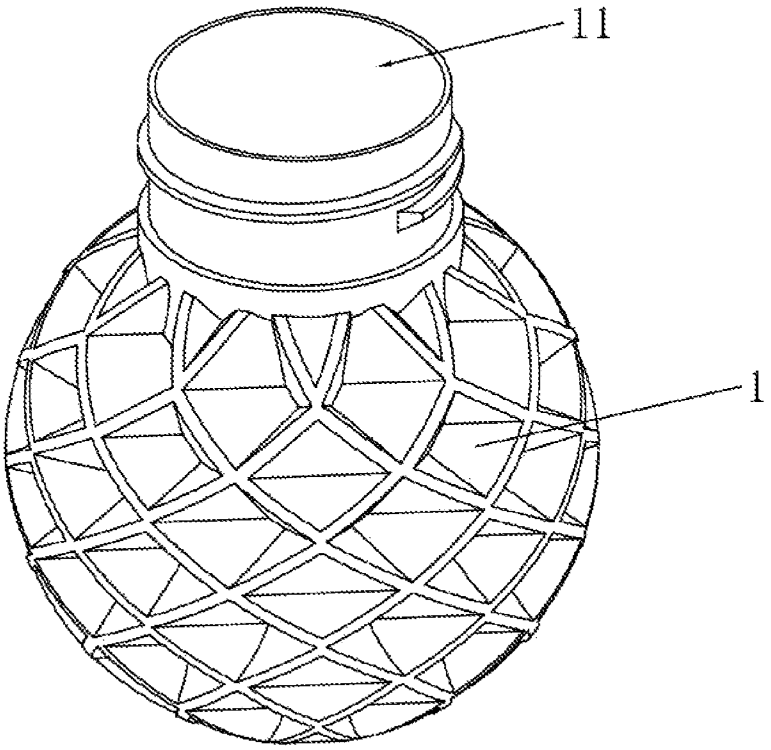
FIG. 10 is a structure diagram of yet another embodiment of a bulb shell of a second embodiment of the present disclosure.
Figure 11:
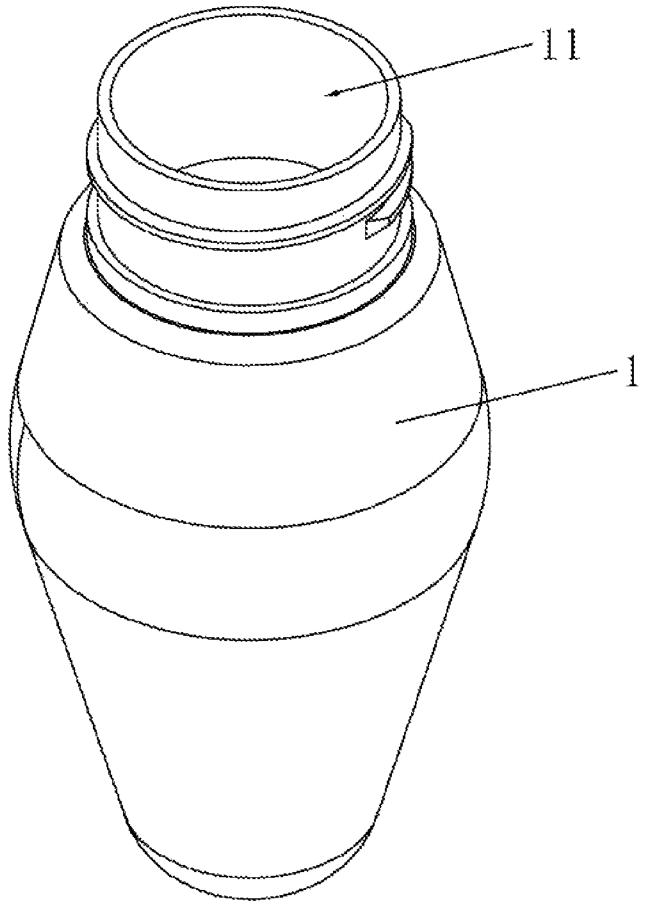
FIG. 11 is a structure diagram of still yet another embodiment of a bulb shell of a second embodiment of the present disclosure.

Embodiment 3: as shown in FIG. 6, the present Embodiment 3 is different from the Embodiment 1 in that: the upper opening of the accommodation cavity 11 of the bulb shell 1 is embedded with a rubber plug 5, the rubber plug 5 has a lower end formed with a PCB clamping slot 4 corresponding to the PCB board 22 that has a downward opening, and the PCB board 22 is clamped and fixed into the PCB clamping slot 4 of the rubber plug 5.

Here, the rubber plug 5 has an upper surface formed with a pin through hole 51 communicated with the PCB clamping slot 4, and the extension pin 23 passes through the pin through hole 51 of the rubber plug 5 and extends to outside the rubber plug 5.

During the installation process of the new bulb structure of the Embodiment 3, the upper end of the PCB board 22 is aligned and embedded into the PCB clamping slot 4 of the rubber plug 5, so that the rubber plug 5 clamps the PCB board 22 through the PCB clamping slot 4. During this process, the extension pin 23 welded on the PCB board 22 extends out through the pin through hole 51 of the rubber plug 5. After the light source module 2 is installed onto the rubber plug 5, the rubber plug 5 is embedded into the upper opening of the accommodation cavity 11 of the bulb shell 1, so that the light source module 2 is installed on the bulb shell 1.

Embodiment 4: as shown in FIG. 6, the present Embodiment 4 is different from the Embodiment 3 in that: the rubber plug 5 has an outer wall formed with an annular groove 52, inside the annular groove 52 is arranged a waterproof rubber ring 6, and the waterproof rubber ring 6 is clamped between the rubber plug 5 and an inner wall of the bulb shell 1.

By means of the waterproof rubber ring 6 clamped between the rubber plug 5 and the inner wall of the accommodation cavity 11 of the bulb shell 1, the present Embodiment 4 can effectively improve the waterproof sealing effect between the rubber plug 5 and the bulb shell 1.

Embodiment 5: as shown in FIG. 6, the present Embodiment 5 is different from the Embodiment 3 in that: the rubber plug 5 has an upper end provided with a limit shoulder 53 projecting outward radially, and the limit shoulder 53 is located against an upper surface of the bulb shell 1.

When to embed the rubber plug 5 into the upper opening of the accommodation cavity 11 of the bulb shell 1, the lower end of the rubber plug 5 is aligned and embedded into the upper opening of the accommodation cavity 11 of the bulb shell 1. When the rubber plug 5 is inserted in place, the rubber plug 5 is located against an upper surface of the bulb shell 1 through the limit shoulder 53, achieving the installation limit of the rubber plug 5.

Embodiment 6: as shown in FIG. 2, FIG. 3 and FIG. 6, the present Embodiment 6 is different from the Embodiment 1 in that: the light source pin 211, the extension pin 23 or the PCB board 22 is provided with a resistor 7.

The above resistor 7 can provide an overvoltage protection for the light-emitting source 21. When the voltage is too high, the resistor 7 can play a role of voltage divider, thereby protecting the light-emitting source 21.

The above are preferred embodiments of the present disclosure merely. For the ordinary skill in the field, changes may be made to both the specific implementation and the application scope according to the idea of the present disclosure. The content of this description should not be understood as a limit to the present disclosure.

What is claimed is:

1. A new bulb structure, comprising a bulb shell (1), a light source module (2) and a power connection copper head (3) arranged on an upper end of the bulb shell (1), the bulb shell (1) having an interior formed with an accommodation cavity (11) having an upward opening, the light source module (2) comprising a light-emitting source (21) inserted into the accommodation cavity (11) of the bulb shell (1), and the light-emitting source (21) being provided with a light source pin (211); wherein the light source module (2) further comprises a PCB board (22), the PCB board (22) is clamped into the upper end of the bulb shell (1), the light source pin (211) is welded to the PCB board (22) and the light source pin (211) is electrically connected to the PCB board 22;

the PCB board (22) is welded with an extension pin (23), and the extension pin (23) has one end electrically connected to the PCB board (22) and the other end electrically connected to the power connection copper head (3);

wherein the upper end of the bulb shell (1) at an upper opening of the accommodation cavity (11) is formed with two aligned PCB clamping slots (4), the PCB board (22) is provided with locating protrusions (221) corresponding to each PCB clamping slot (4) respectively, and each locating protrusion (221) of the PCB board (22) is clamped and fixed into a corresponding PCB clamping slot (4) respectively.

2. The new bulb structure according to claim 1, wherein the upper opening of the accommodation cavity (11) of the bulb shell (1) is embedded with a rubber plug (5), the rubber plug (5) has a lower end formed with a PCB clamping slot (4) corresponding to the PCB board (22) that has a downward opening, and the PCB board (22) is clamped and fixed into the PCB clamping slot (4) of the rubber plug (5);

the rubber plug (5) has an upper surface formed with a pin through hole (51) communicated with the PCB clamping slot (4), and the extension pin (23) passes through the pin through hole (51) of the rubber plug (5) and extends to outside the rubber plug (5).

3. The new bulb structure according to claim 2, wherein the rubber plug (5) has an outer wall formed with an annular groove (52), inside the annular groove (52) is arranged a waterproof rubber ring (6), and the waterproof rubber ring (6) is clamped between the rubber plug (5) and an inner wall of the bulb shell (1).

4. The new bulb structure according to claim 2, Wherein the rubber plug (5) has an upper end provided with a limit shoulder (53) projecting outward radially, and the limit shoulder (53) is located against an upper surface of the bulb shell (1).

5. The new bulb structure according to claim 1, wherein the light source pin (211), the extension pin (23) or the PCB board (22) is provided with a resistor (7).

6. The new bulb structure according to claim 1, Wherein the power connection copper head (3) is screwed onto the upper end of the bulb shell (1).

* * * * *